United States Patent
Egan

(10) Patent No.: US 10,125,920 B1
(45) Date of Patent: Nov. 13, 2018

(54) PORTABLE LIFTING AND TRANSFERRING TECHNIQUES

(71) Applicant: Thomas F. Egan, Binghamton, NY (US)

(72) Inventor: Thomas F. Egan, Binghamton, NY (US)

(*) Notice: Subject to any disclaimer, the term of this patent is extended or adjusted under 35 U.S.C. 154(b) by 0 days.

(21) Appl. No.: 15/732,846

(22) Filed: Jan. 5, 2018

Related U.S. Application Data

(63) Continuation of application No. 14/757,352, filed on Dec. 21, 2015, now Pat. No. 9,863,577, which is a continuation of application No. 13/999,392, filed on Feb. 21, 2014, now Pat. No. 9,217,535, which is a continuation of application No. 61/850,684, filed on Feb. 21, 2013.

(51) Int. Cl.
| | | |
|---|---|---|
| *F16M 11/00* | (2006.01) | |
| *F16M 13/02* | (2006.01) | |
| *A61G 3/06* | (2006.01) | |

(52) U.S. Cl.
CPC .............. *F16M 13/02* (2013.01); *A61G 3/062* (2013.01); *F16M 13/022* (2013.01)

(58) Field of Classification Search
None
See application file for complete search history.

(56) References Cited

U.S. PATENT DOCUMENTS

| | | | | |
|---|---|---|---|---|
| 3,175,696 A | * | 3/1965 | Milbourne | A47G 25/06 16/223 |
| 3,222,029 A | * | 12/1965 | Hildemann | A61G 7/1017 254/124 |
| 3,659,594 A | * | 5/1972 | Schwab | A61H 1/0218 5/86.1 |
| 3,677,424 A | * | 7/1972 | Anderson | A61G 7/1017 414/550 |
| 4,456,421 A | * | 6/1984 | Robson | B60P 1/4428 414/541 |
| 4,534,450 A | * | 8/1985 | Savaria | B66F 7/0641 414/546 |
| 4,644,595 A | * | 2/1987 | Daniel | A61G 7/0533 5/83.1 |
| 4,775,282 A | * | 10/1988 | Van Vliet | A61G 3/0209 224/519 |
| 5,077,844 A | * | 1/1992 | Twitchell | A61G 7/1017 212/232 |
| 5,156,517 A | * | 10/1992 | Boissonneault | B60P 1/5471 212/232 |
| 5,263,207 A | * | 11/1993 | Gilbert | A47K 3/12 4/562.1 |
| 5,335,970 A | * | 8/1994 | Bryant | A47C 9/06 248/282.1 |

(Continued)

*Primary Examiner* — Monica E Millner

(57) ABSTRACT

Portable lifting and transferring techniques for assisting in the mobility of disabled persons are disclosed. In one particular embodiment, the techniques may be realized as a portable lifting and transferring apparatus for assisting disabled persons that is compact, lightweight, and portable for use in different locations. Preferably, such an apparatus would provide multiple pivot points for providing multiple degrees of maneuvering freedom when lifting and transferring disabled persons and/or their mobility devices and for providing compatibility with a wide range of vehicles. The techniques may also be realized in other embodiments as disclosed herein.

20 Claims, 17 Drawing Sheets

(56) References Cited

U.S. PATENT DOCUMENTS

| | | | | |
|---|---|---|---|---|
| 5,396,670 | A * | 3/1995 | Firebaugh | A61G 7/1017 294/140 |
| 5,427,289 | A * | 6/1995 | Ostor | B60R 9/06 224/282 |
| 6,378,659 | B1 * | 4/2002 | Krumbeck | A61G 7/1005 187/200 |
| 6,595,398 | B2 * | 7/2003 | Himel, Jr. | B60R 9/06 224/495 |
| 6,651,280 | B2 * | 11/2003 | Blevins | A61G 7/1011 414/921 |
| 6,806,430 | B2 * | 10/2004 | Downing | G01G 19/44 177/144 |
| 8,656,529 | B2 * | 2/2014 | Corriveau | A61G 7/1017 5/83.1 |
| 9,217,535 | B1 * | 12/2015 | Egan | A61G 3/02 |
| 9,863,577 | B1 * | 1/2018 | Egan | F16M 13/02 |
| 2011/0268545 | A1 * | 11/2011 | Fakhrizadeh | A61G 3/062 414/543 |

* cited by examiner

PORTABLE LIFTING AND TRANSFERRING TECHNIQUES

CROSS-REFERENCE TO RELATED APPLICATIONS

This patent application is a continuation of U.S. patent application Ser. No. 14/757,352, filed Dec. 21, 2015, now U.S. Pat. No. 9,863,577, which is a continuation of U.S. patent application Ser. No. 13/999,392, filed Feb. 21, 2014, now U.S. Pat. No. 9,217,535, which claims priority to U.S. Provisional Patent Application No. 61/850,684, filed Feb. 21, 2013, each of which is hereby incorporated by reference herein in its entirety.

FIELD OF THE DISCLOSURE

The present invention relates generally to devices which may be used for lifting and transferring disabled persons and, more particularly, to portable lifting and transferring techniques for assisting in the mobility of disabled persons.

BACKGROUND OF THE DISCLOSURE

Disabled persons often have trouble in transferring from one location to another. Particularly in the case of wheelchair bound persons, it is often quite difficult to lift and transfer such persons to and from their wheelchair from and to, for example, a car, a bath or shower, or a bed. It can also be quite difficult to lift and transfer mobility devices such as wheelchairs and scooters after a disabled person has been removed therefrom. One or more persons are usually required to assist the disabled person.

There have been some inventive efforts directed at alleviating the problems associated with transferring disabled persons from one location to another. For example, in U.S. Pat. No. 4,365,924, Brigman et al. disclose a disabled person transfer device for transferring a disabled person from a wheelchair to a vehicle. Also, in U.S. Pat. No. 5,459,891, Reeve et al. disclose a hydraulically powered lift and transport apparatus for lifting and transporting wheelchair bound persons.

The aforementioned patents disclose devices which allow a disabled person to be lifted from a wheelchair or a bed to another location. However, the devices disclosed in both of these patents, as well as other known devices, have drawbacks in the areas of cost and complexity which could limit the potential mobility of a disabled individual. For instance, the disabled person transfer device disclosed in U.S. Pat. No. 4,365,924 requires extensive modifications to a vehicle as well as a modified wheelchair for use with the device. Also, the lift and transport apparatus disclosed in U.S. Pat. No. 5,459,891 requires a remotely located hydraulic pump and 120 VAC current to power the various components of the apparatus. Furthermore, the devices disclosed in both of the aforementioned patents are essentially permanently installed, thus lacking in portability. Similar drawbacks exist for other known lifting and transferring devices.

In view of the foregoing, it may be understood that there may be significant problems and shortcomings associated with current lifting and transferring devices.

SUMMARY OF THE DISCLOSURE

Portable lifting and transferring techniques for assisting in the mobility of disabled persons are disclosed. In one particular embodiment, the techniques may be realized as a portable lifting and transferring apparatus for assisting disabled persons that is compact, lightweight, and portable for use in different locations. Preferably, such an apparatus would provide multiple pivot points for providing multiple degrees of maneuvering freedom when lifting and transferring disabled persons and/or their mobility devices and for providing compatibility with a wide range of vehicles. The techniques may also be realized in other embodiments as disclosed herein.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings disclose the present invention in four versions. These drawings should not be construed as limiting the present disclosure, but are intended to be illustrative only.

DETAILED DESCRIPTION OF EMBODIMENTS

Figure 1:
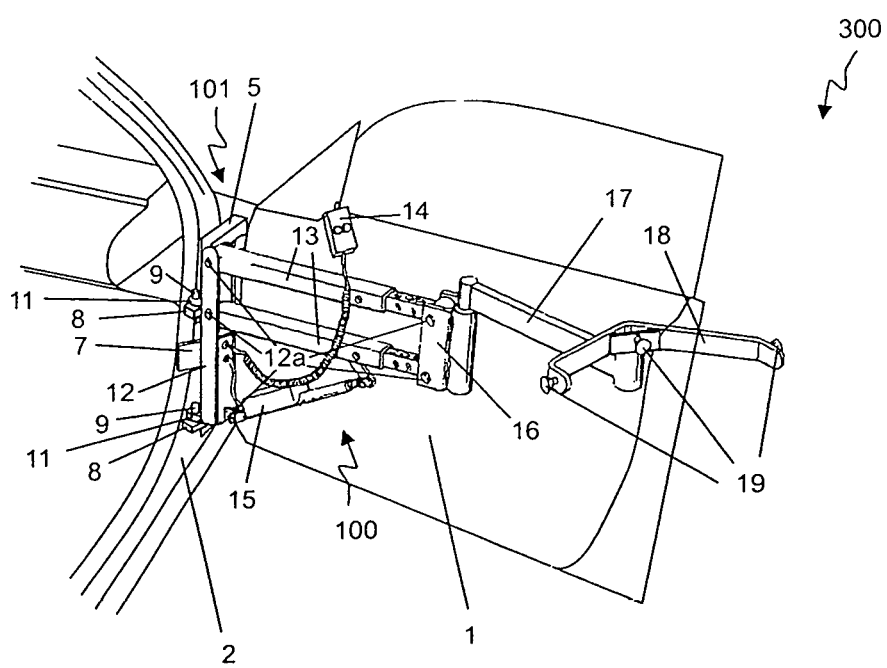
FIG. 1 shows a power lift and transfer system and attachment method in accordance with an embodiment of the present disclosure in a hinge-mounted support assembly version, in conjunction with a parallelogram-style personal transfer lift, with a hinge-mounted support assembly in place on a hinge, and the parallelogram-style personal transfer lift mounted on the hinge-mounted support assembly.
Figure 2:
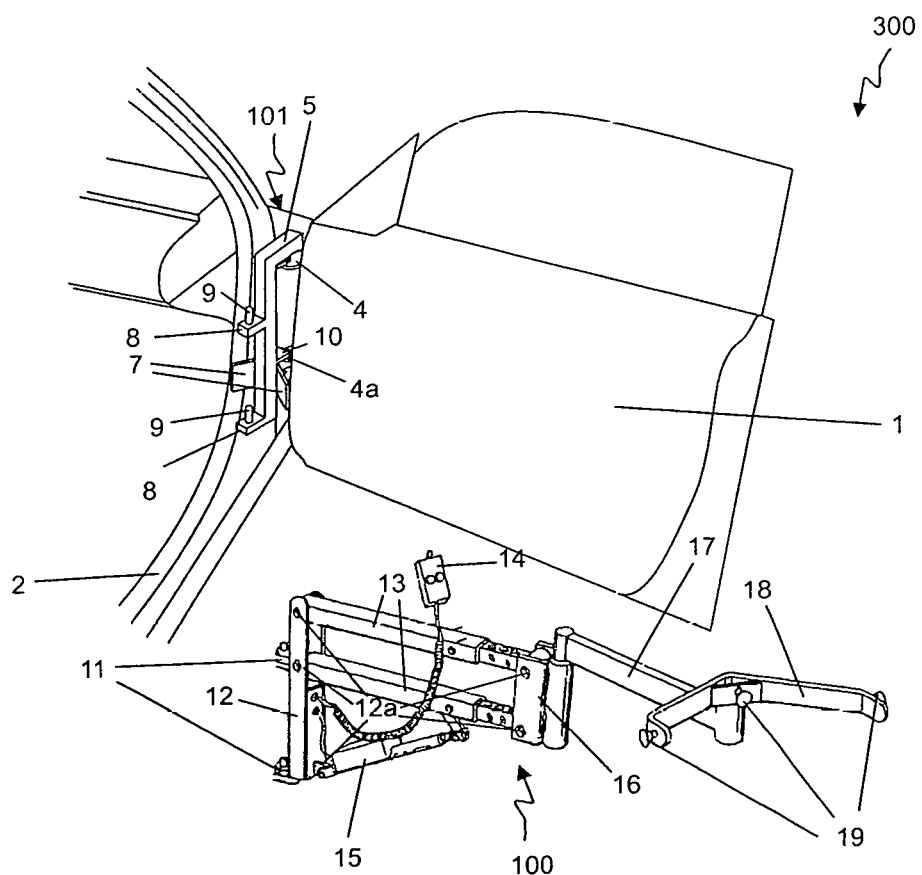
FIG. 2 shows a power lift and transfer system and attachment method in accordance with an embodiment of the present disclosure in a hinge-mounted support assembly version, in conjunction with a parallelogram-style personal transfer lift, with a hinge-mounted support assembly in place on a hinge, and the parallelogram-style personal transfer lift detached from the hinge-mounted support assembly.
Figure 3:
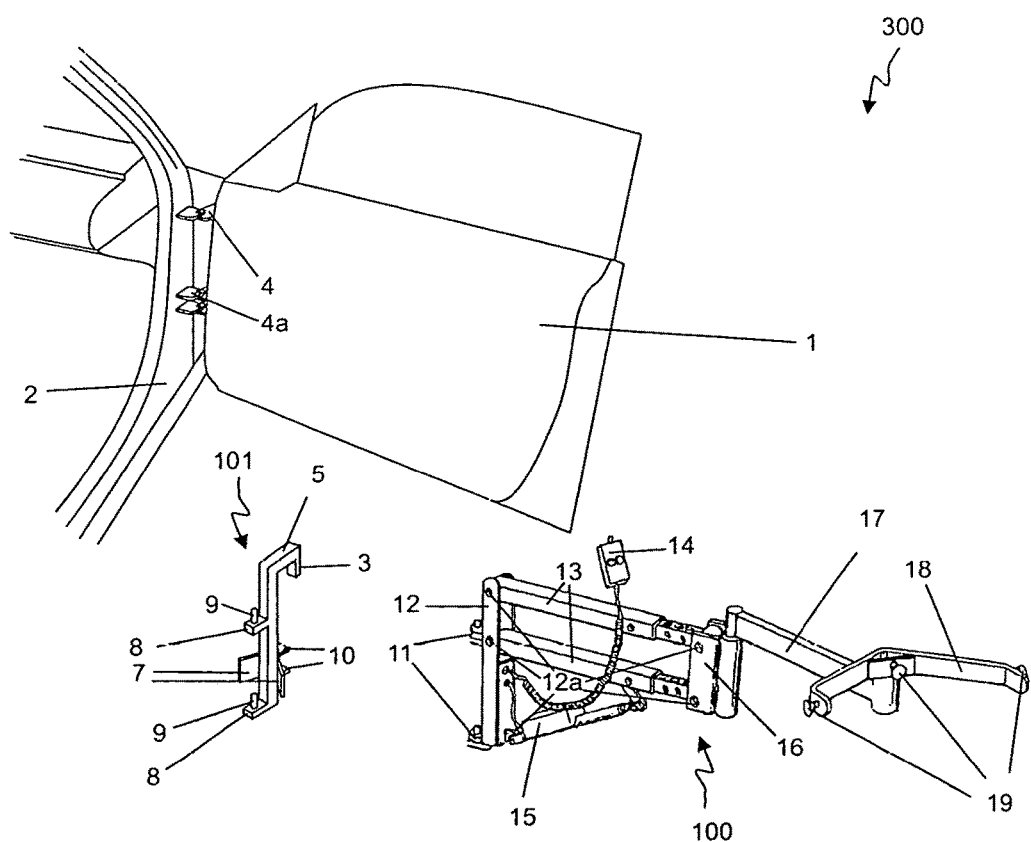
FIG. 3 shows a power lift and transfer system and attachment method in accordance with an embodiment of the present disclosure in a hinge-mounted support assembly version, in conjunction with a parallelogram-style personal transfer lift, with a hinge-mounted support assembly detached from a hinge, and the parallelogram-style personal transfer lift detached from the hinge-mounted support assembly.
Figure 4:
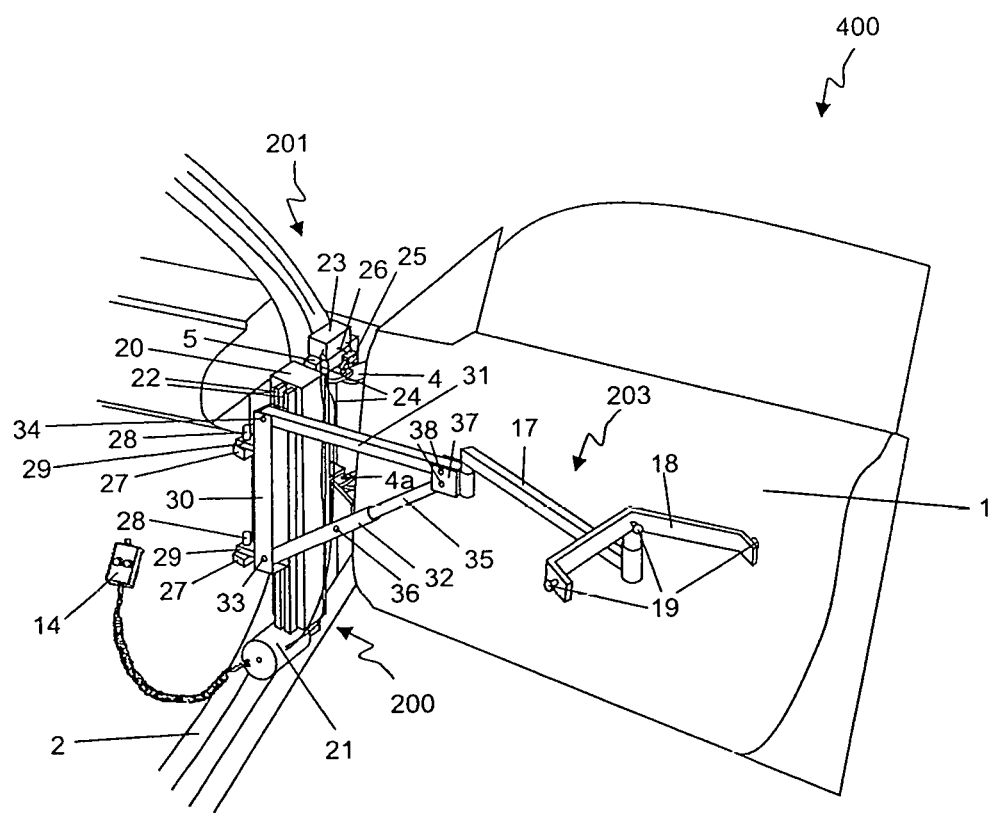
FIG. 4 shows a power lift and transfer system and attachment method in accordance with an embodiment of the present disclosure in a hinge-mounted support/integrated actuator style personal transfer lift version, with an integrated actuator style personal transfer lift in place on a hinge, and a personal transfer support system mounted on the integrated actuator style personal transfer lift.
Figure 5:
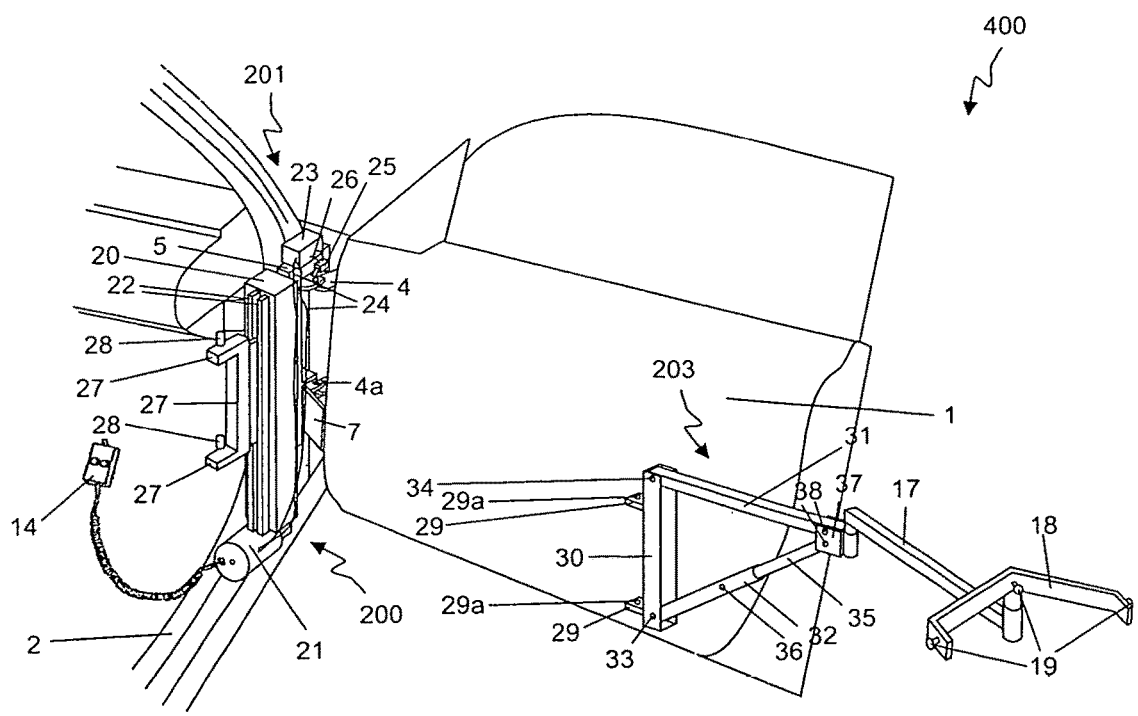
FIG. 5 shows a power lift and transfer system and attachment method in accordance with an embodiment of the present disclosure in a hinge-mounted support/integrated actuator style personal transfer lift version, with an integrated actuator style personal transfer lift in place on a hinge, and a personal transfer support system detached from the integrated actuator style personal transfer lift.
Figure 6:
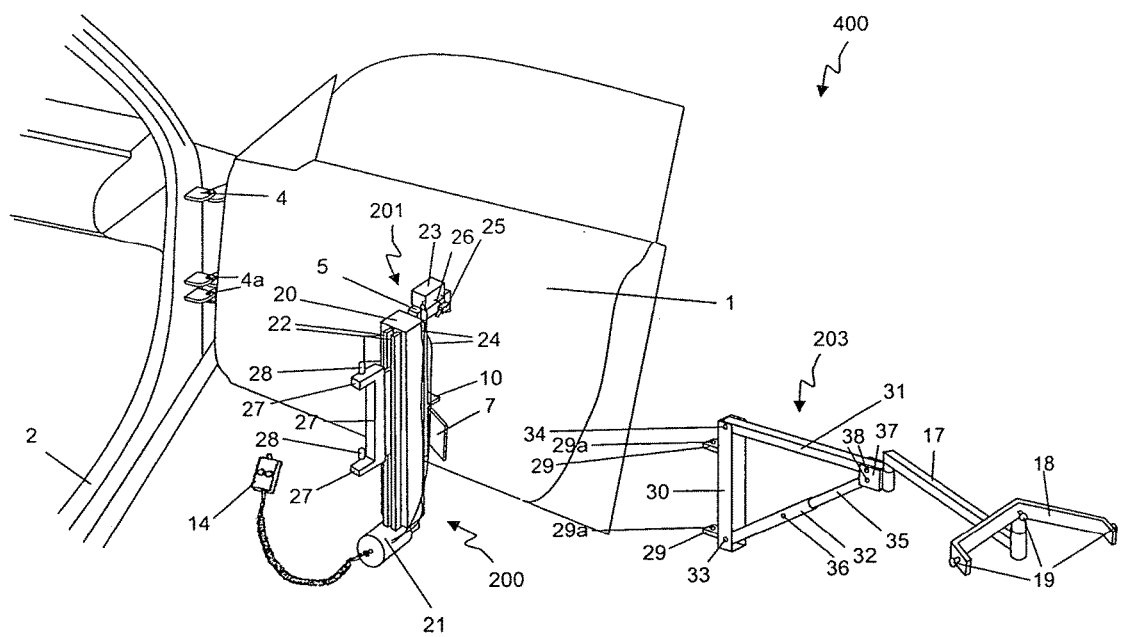
FIG. 6 shows a power lift and transfer system and attachment method in accordance with an embodiment of the present disclosure in a hinge-mounted support/integrated actuator style personal transfer lift version, with an integrated actuator style personal transfer lift detached from a hinge, and a personal transfer support system detached from the integrated actuator style personal transfer lift.
Figure 7:
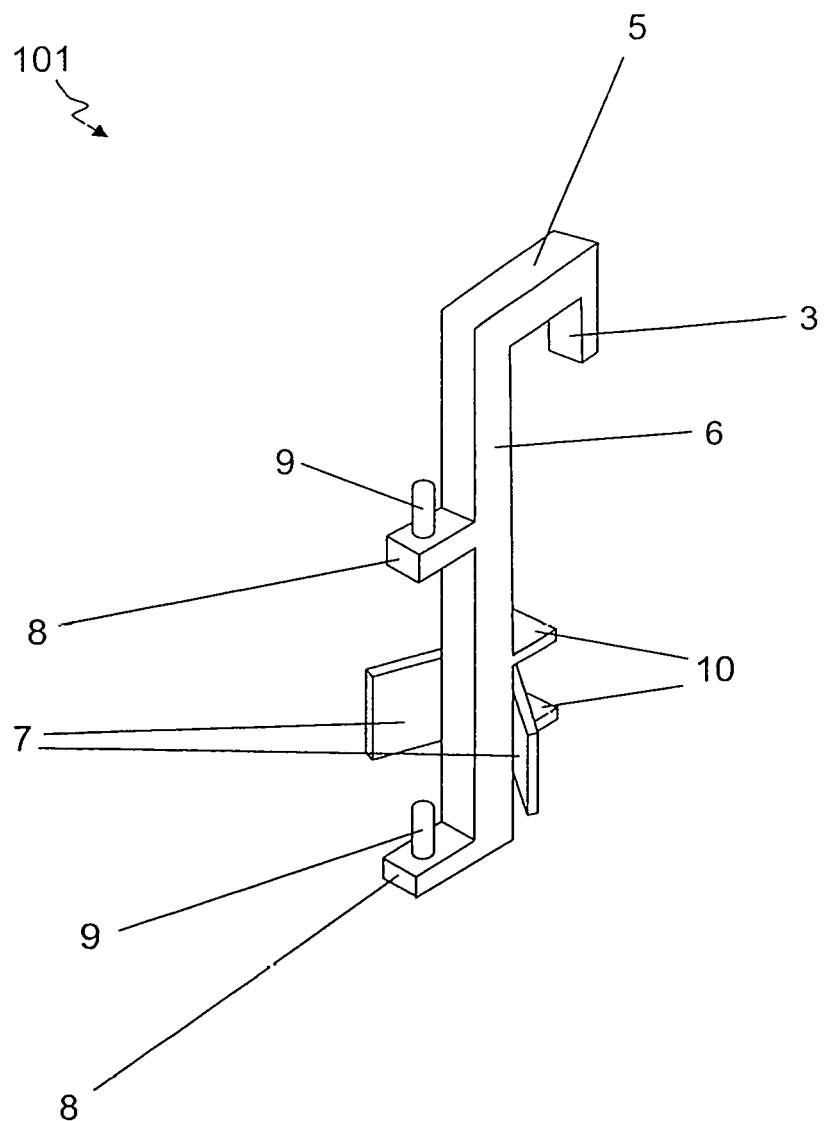
FIG. 7 shows a hinge-mounted support assembly in accordance with an embodiment of the present disclosure, for use in conjunction with a parallelogram-style personal transfer lift.
Figure 15:
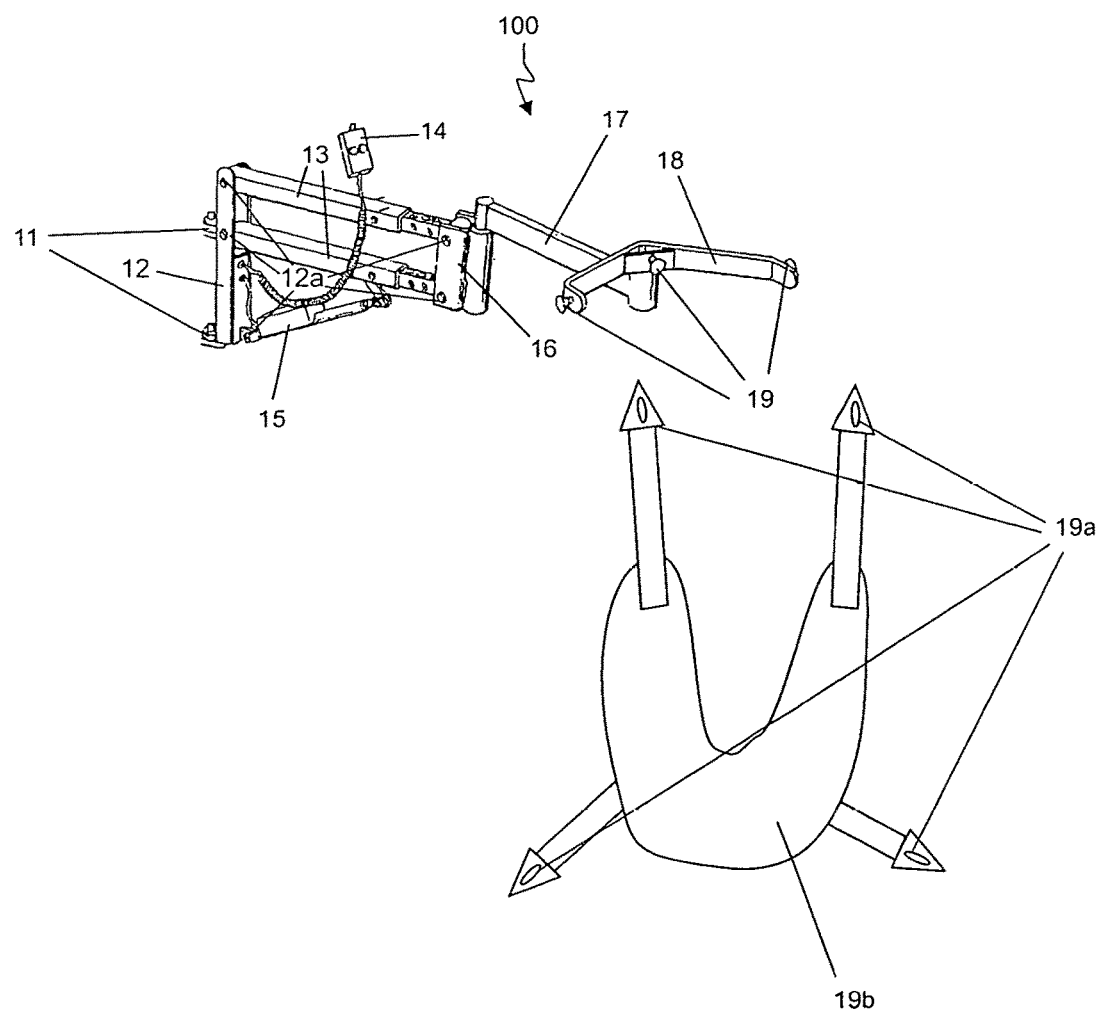
FIG. 15 shows a power lift and transfer system and attachment method in accordance with an embodiment of the present disclosure in a parallelogram-style personal transfer lift version, in conjunction with a sling system.

Referring to FIGS. 1, 2, 3, and 7, there is shown a system 300 in accordance with an embodiment of the present disclosure comprising a parallelogram-style personal transfer lift 100 as detailed in FIG. 15, used in conjunction with a hinge mounted hook support assembly 101. Beginning from the left of system 300, moving upward and rightward, the system 300 includes hinge-mounted hook support assembly 101, which includes a hinge hook 3, shaped and designed to hook over or under upper hinge 4. A wide variety of hinges and hinge configurations, as well as available space are determining factors in whether hinge hook 3 must be inserted under upper hinge 4 or in the more traditional configuration on top of upper hinge 4. Hinge hook 3 is securely connected to horizontal support 5, which in turn is securely connected to vertical support 6, which is in turn securely connected to stabilization flanges 7 and pin support tabs 8. Pin supports 9 are securely inserted in pin support tabs 8. FIGS. 3 and 7 show detail views of the construction of the hinge-mounted hook support assembly 101, including lower hinge capture 10 designed to encapsulate lower hinge 4a. Hinge capture 10 provides additional security for users of the system 300 in that its channel design captures lower hinge 4a, preventing the possibility of hinge hook 3 becoming dislodged from upper hinge 4 due to improper placement of hinge support assembly 101, resulting in dislodging of system 300 and potential user injury.

Stabilization flanges 7 provide additional lateral stabilization for hinge support assembly 101 by pressing on door 1 and vehicle 2. This is especially important as the system 300 is designed to transport a user from outside of the vehicle 2 to inside of the vehicle 2, thus necessitating a significant shift in the load center the system 300 is designed to bear, and the resulting torsional force on hinge support assembly 101. Pin support tabs 8 are firmly attached to vertical support 6, and in turn provide support for pins 9 which are designed to be inserted in pin receiver 11 of parallelogram-style personal transfer lift 100 in such a manner as to allow rotation about a substantially vertical axis, thus facilitating horizontal motion during lifting and transferring operations of system 300.

At this point, it should be noted that although hinge support assembly 101 as shown in FIG. 7 is comprised of several component parts 3, 5, 6, 7, 8, 9, 10, a variety of manufacturing techniques could allow the system to be cast or molded and made from a wide variety of materials which could allow support assembly 101 to be made from fewer subcomponents, or even as a single unit. It should also be noted that the interlocking design of the hinge-mounted hook support assembly 101 presents significant advantages for users of a lifting and transferring system, as it obviates the need for drilling, modifying, or any installation whatsoever. Users can use virtually any car, even a rental car, and install or uninstall the lift on a moment's notice without special skills or tools. The narrow profile of the hinge-mounted hook support assembly 101 maximizes the space available to the user and to the parallelogram-style personal transfer lift 100 by placing it in the closest possible proximity to upper hinge 4 and lower hinge 4a. In view of the significant dual constraints of the size of the user or load to be transferred, and the limited space of the door 1 opening of the vehicle 2, this presents obvious advantages. Since the initial stages of the insertion of hinge-mounted hook support assembly 101 involve the insertion of a relatively small hinge hook 3 over or under a relatively larger upper hinge 4, followed by a small rotation of vertical support 6 to ensure full engagement of optional lower hinge capture 10, the entire process is relatively easy for even the least mechanically-orientated of users.

The parallelogram-style personal transfer lift 100 shown in FIGS. 1, 2, 3, and 15 could be a lifting and transferring device such as described in U.S. Pat. No. 6,042,330, naming the same inventor as in the present application. The parallelogram-style personal transfer lift 100 used in conjunction with sling 19b provides a proven and effective method of transferring a user or load into and out of vehicle 2, due to multiple pivot points about a substantially vertical axis associated with pins 9, and the rotating motion of swingarm 17 in swingarm pivot barrel 16 as well as spreader bar 18 as it pivots with swingarm 17. These multiple pivot points as well as the lifting motion of actuator 15, activated by control switch 14, provide complete three-dimensional movement commensurate with the spatial requirements of a wide variety of shapes and sizes of vehicles available on today's market.

FIGS. 1, 2, 3, and 15 show pin receiver tab 11 designed to receive pin 9 of hinge-mounted hook support assembly 101. Pin receiver tab 11 is in turn firmly connected to lift assembly vertical support 12, which is in turn connected by means of bolts 12a to parallel arms 13, and drive actuator 15. The extension and retraction of drive actuator 15, connected to parallel arms 13, creates an upward and downward motion of swingarm pivot barrel 16, swingarm 17, spreader bar 18, sling 19b, and thus the user. Parallel arms 13 are connected through bolts 12a to lift assembly vertical support 12 and swingarm pivot barrel 16 in such a manner that the ends of parallel arms 13 pivot in a substantially horizontal axis about bolts 12a. Sling 19b can be freely connected and disconnected from pins 19 on spreader bar 18 so as to facilitate placement of the sling in preparation for lifting and transferring, or stowage. Thus, in the course of normal usage, door 1 is opened, hinge-mounted hook support assembly 101 is placed over upper hinge 4 and rotated to lock against lower hinge 4a, then parallelogram-style personal transfer lift 100 is placed on hinge-mounted hook support assembly 101 such that pins 9 are inserted into pin receiver tabs 11, swingarm 17 is inserted into swingarm pivot barrel 16, spreader bar 18 is inserted into swingarm 17, sling 19b is inserted around the user, sling 19b is connected via sling belts 19a onto pins 19. At this point, using a combination of up-and-down motion of parallelogram-style personal transfer lift 100, controlled by control switch 14, and pivoting motions between spreader bar 18, swingarm 17, and pins 9, the user can easily be transferred into and out of vehicle 2.

Figure 8:
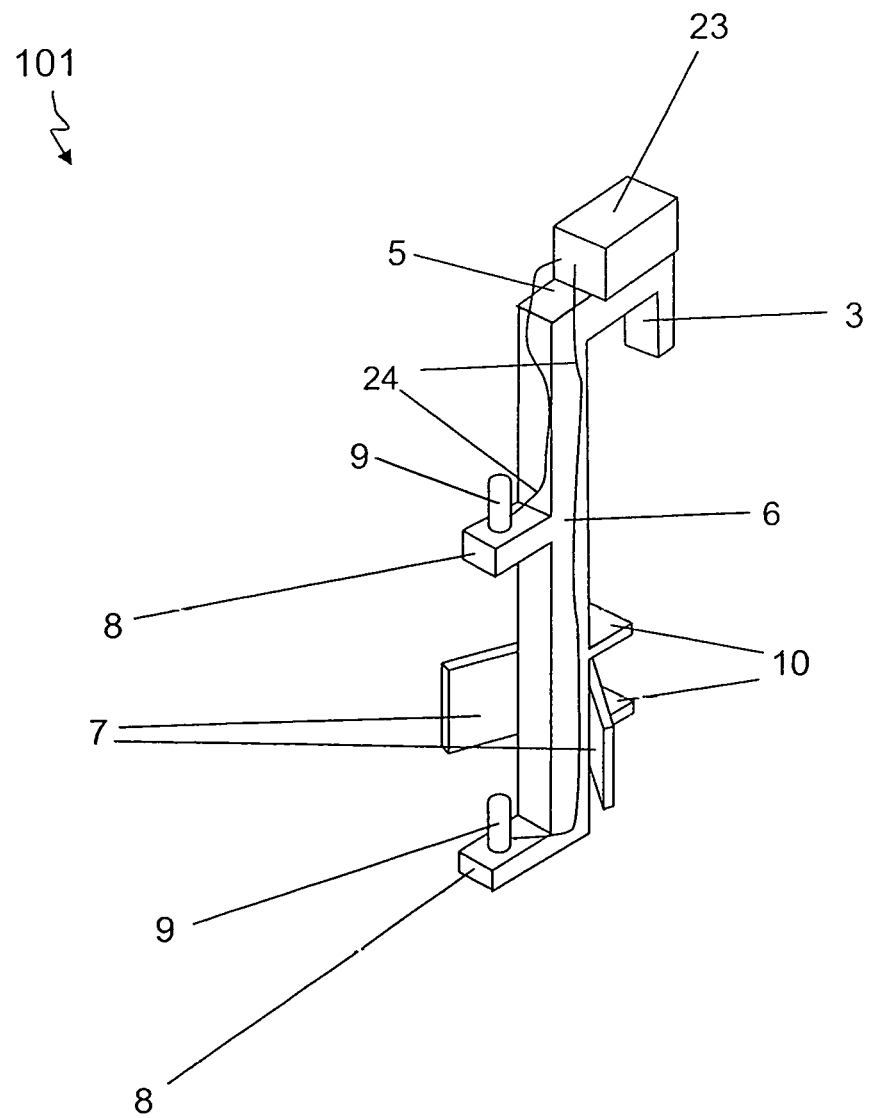
FIG. 8 shows a hinge-mounted support assembly in accordance with an embodiment of the present disclosure, for use in conjunction with a parallelogram-style personal transfer lift, with integrated battery.
Figure 9:
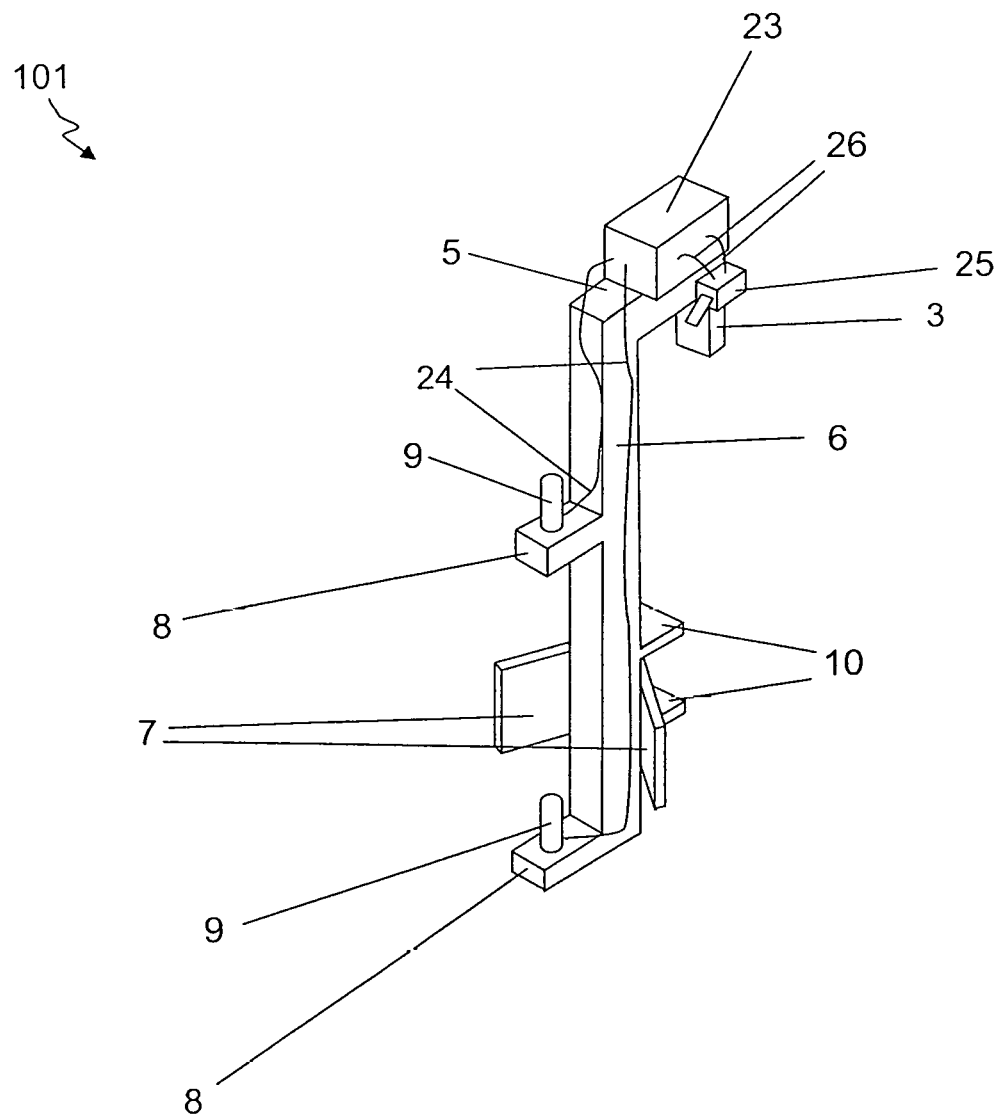
FIG. 9 shows a hinge-mounted support assembly in accordance with an embodiment of the present disclosure, for use in conjunction with a parallelogram-style personal transfer lift, with integrated battery, and safety cutoff switch.
Figure 10:
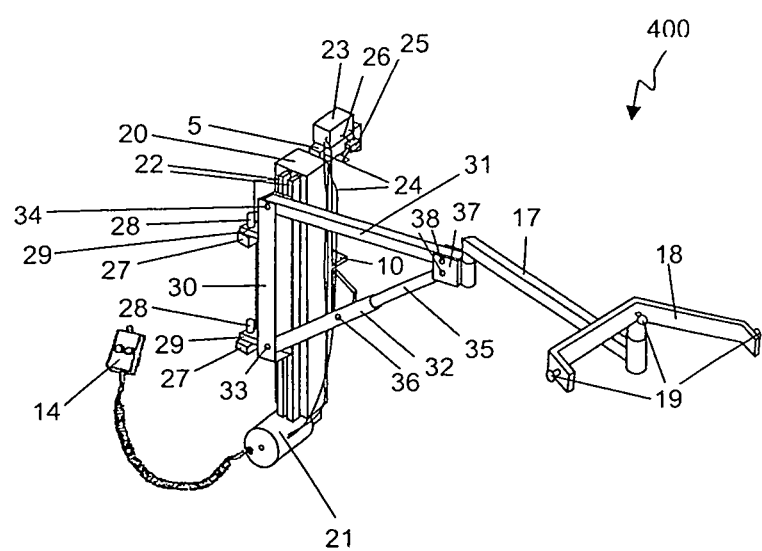
FIG. 10 shows a power lift and transfer system and attachment method in accordance with an embodiment of the present disclosure in a hinge-mounted support/integrated actuator style personal transfer lift version, with a personal transfer support system mounted on the integrated actuator style personal transfer lift.
Figure 11:
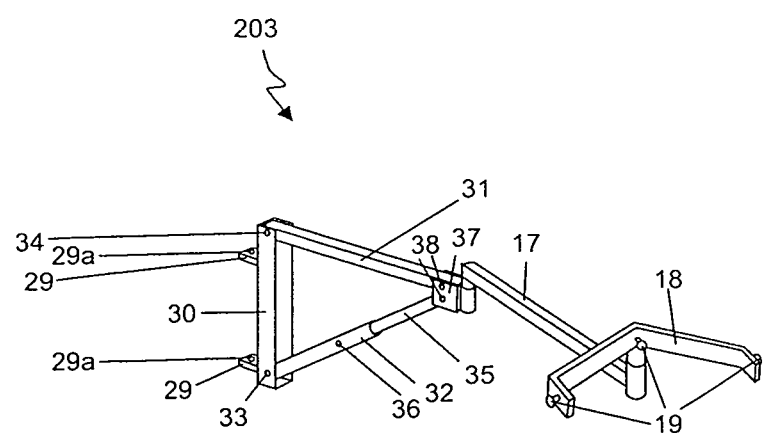
FIG. 11 shows a personal transfer support assembly in accordance with an embodiment of the present disclosure, for use in conjunction with an integrated actuator style personal transfer lift.

Referring to FIGS. 8 and 9, there is shown a hinge-mounted hook support assembly 101 with the added feature of a battery 23, as shown in FIG. 8, and a battery 23 with safety interlock switch 25, as shown in FIG. 9. Battery 23 is shown mounted to horizontal support 5, however can be mounted anywhere where space is available on hinge-mounted hook support assembly 101. Battery 23 provides power to parallelogram-style personal transfer lift 100, and may optionally be connected electrically via power wires 24 to pins 9 for the purpose of providing power to parallelogram-style personal transfer lift 100, without the need for any action on the part of the user to provide an electrical connection. This feature provides a clear advantage for the user by eliminating the need for the extra step of an external power connection for the parallelogram-style personal transfer lift 100, or any other type of powered lift. The safety interlock switch 25 is electrically connected to battery 23 through safety interlock switch wires 26 in such a manner that when safety interlock switch 25 is not activated by contact with upper hinge 4, battery 23 will no longer supply power, and no lifting or transferring may be done. Safety interlock switch 25 thus avoids the possibility that an improperly or incompletely placed hinge-mounted hook support assembly 101 could become detached during the lifting and transferring process, thus resulting in injury to the user or assistant or damage to the vehicle from the impact of a falling load.

FIGS. 4, 5, 6, 10, and 11 refer to an integrated hook support/actuator style lift 200 used in conjunction with a hinge-mounted hook support assembly 201, referred to collectively as system 400. Beginning from the left of system 400, moving upward and rightward, the system 400 includes hinge-mounted hook support assembly 201, which includes a hinge hook 3, shaped and designed to hook over or under upper hinge 4. A wide variety of hinges and hinge configurations, as well as available space are determining factors in whether hinge hook 3 must be inserted under upper hinge 4 or in the more traditional configuration on top of upper hinge 4. Hinge hook 3 is securely connected to horizontal support 5, which is in turn firmly connected to drive assembly housing 20, which contains drive. actuator assembly 21, which drives drive trolley 27 up and down in a substantially vertical direction. Drive trolley stabilization flanges 22 provide lateral stability for drive trolley 27 so as to avoid a shaking motion in the mechanism which would be disconcerting to the user, and potentially cause undue wear. Drive trolley pins 28 are firmly connected to drive trolley 27 in a substantially vertical orientation so as to facilitate the rotation of pivot support assembly 203 through pins 28 and pin receiver tabs 29, allowing for horizontal maneuvering much as described above with reference to FIGS. 1, 2, 3, and 15.

Continuing rightward, pin receiver tabs 29 are firmly connected to lift assembly vertical support 30, which is in turn pivotally connected to horizontal arm 31 and diagonal support outer tube 32 by means of bolts 34 and 33. Diagonal support outer tube 32 is connected to diagonal support inner tube 35 by means of diagonal support stowage button 36, whose purpose is to facilitate release and downward rotation of horizontal arm 31 for purposes of stowage. It should be noted that diagonal support inner tube 35, diagonal support outer tube 32, and diagonal support stowage button 36 may be combined into a single solid component to reduce cost and complexity. Horizontal arm 31 and diagonal support inner tube 35 are connected to swingarm pivot barrel 37 which provides a pivotal joint for swingarm 17 to rotate about a substantially vertical axis. Swingarm 17, spreader bar 18, sling securement pins 19, sling 19b, and sling belts 19a all function as described above with reference to FIGS. 1, 2, 3, and 15. Up and down motion is accomplished by means of activation of control switch 14, thus activating drive actuator assembly 21 and moving the drive trolley 27 vertically, which in turn raises and lowers pivot support assembly 203, and thus the user. Bolts 38 secure swingarm pivot barrel 37 to lift assembly horizontal arm 31 and lift assembly diagonal support inner tube 35.

From a user and functional perspective, the system 400 comprising integrated hook support/actuator style lift 200 with hinge-mounted hook support assembly 201 as shown in FIGS. 4, 5, 6, 10, and 11 operates nearly identically to system 300. The operation, components, and features of hinge-mounted hook support assembly 201 of system 400 are analogous to hinge-mounted hook support assembly 101 of system 300. Functional aspects, operational description, safety features, and advantages of stabilization flanges 7, lower hinge capture 10, sling 19b, sling belts 19a, spreader bar 18, optional battery 23, and safety interlock switch 25, as well as overall operation as described with reference to FIGS. 1, 2, 3, and 15, again apply unchanged to integrated hook support/actuator style lift system 400 as shown in FIGS. 4, 5, 6, 10, and 11.

In addition to sharing the advantages of the parallelogram-style personal transfer lift system 300, the integrated hook support/actuator style lift with hinge-mounted hook support assembly 400 presents notable advantages from a functional and practical perspective. With hinge-mounted hook support assembly 400, the user avoids the step of placing a relatively clumsy and unbalanced lifting mechanism with a compact, lighter and more balanced unit, the integrated hook support/actuator style lift 200. This elimination also reduces overall weight since major moving components are reduced from 5 to 4. In the parallelogram-style personal transfer lift system 300, there may be significant torsion exerted on major structural components, thus the torsional qualities of aluminum or other lightweight material may not be optimal for this design, however in the integrated hook support/actuator style lift 200, there are no such constraints, thus aluminum or other lightweight construction materials may be used in many if not most structural components, thus significantly reducing weight. For users and assistants with or without disabilities, reducing weight can be of significant practical benefit and a notable market advantage for manufacturers of such products.

As an option for hinge-mounted hook support assembly 400, the integrated hook support/actuator style lift 200 may be integrated with the pivot support assembly 203, such that the pivot support assembly 203 and drive trolley pins 28 are fully integrated in drive trolley 27. With this option, the number of major components of system 400 is reduced from four components in the parallelogram-style personal transfer lift with hinge mounted hook support assembly system 300 to three components, or even one if swingarm pivot barrel 37 is permanently connected to swingarm 17, and spreader bar 18 is permanently connected to swingarm 17.

Figure 12:
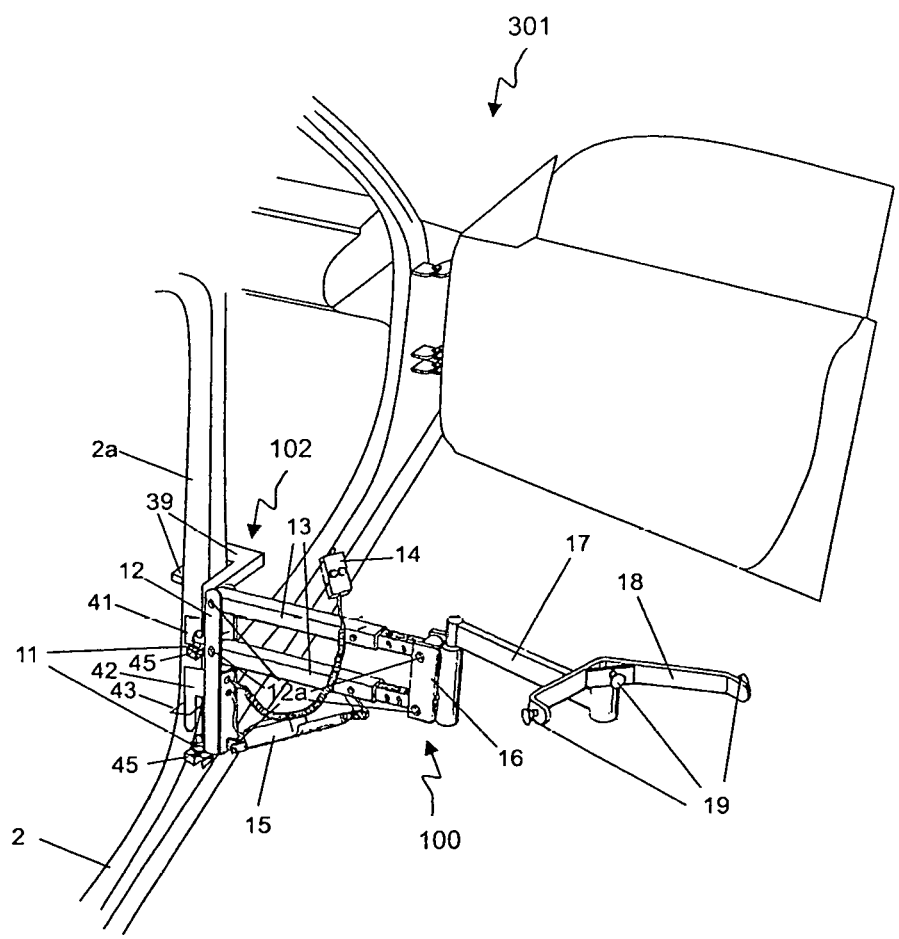
FIG. 12 shows a power lift and transfer system and attachment method in accordance with an embodiment of the present disclosure in a "B"-pillar-mounted support assembly version, in conjunction with a parallelogram-style personal transfer lift, with a "B"-pillar-mounted support assembly in place on a "B"-pillar, and the parallelogram-style personal transfer lift mounted on the "B"-pillar-mounted support assembly.
Figure 14:
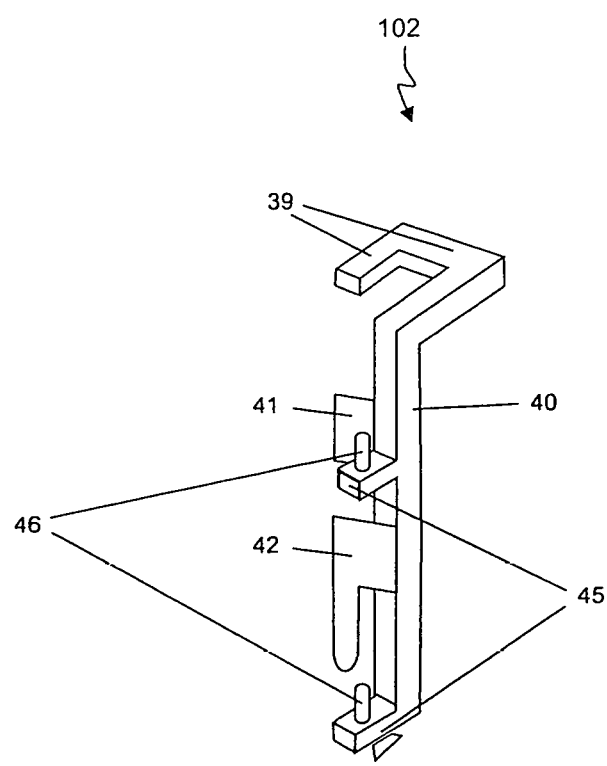
FIG. 14 shows a "B"-pillar-mounted support assembly in accordance with an embodiment of the present disclosure, for use in conjunction with a parallelogram-style personal transfer lift.

Referring to FIGS. 12, 14, and 15, there is shown a system 301 comprising parallelogram-style personal transfer lift 100 as detailed in FIG. 15 used with a "B"-pillar mounted hook support assembly 102 in accordance with an embodiment of the present disclosure. Beginning from the left of system 301, moving upward and rightward, the system 301 includes "B"-pillar mounted hook support assembly 102, which includes an upper hook 39, shaped and designed to capture a portion of the "B"-pillar of vehicle 2, thus stabilizing hinge-mounted hook support assembly 102, and supporting it to counter rearward, outward, and inward forces. FIG. 14 shows a "B"-pillar-mounted hook support assembly 102 in detail, including stabilization flange 41, whose purpose is to counter the remaining forward rotation motion that upper hook 39 is unable to accomplish. Locking pin 42 has as its purpose to engage in striker 43, often but not necessarily a factory-included feature of the vehicle 2 in such a manner that the lower portion "B"-pillar-mounted hook support assembly 102 cannot move substantially in any direction under load when used in conjunction with parallelogram-style personal transfer lift 100. Vertical support 40 provides the basic structure of the assembly 102 to which upper hook 39, stabilization flange 41, locking pin 42, and support tabs 45, and pins 46 are firmly connected.

Upon substantial rotation of "B"-pillar-mounted hook support assembly 102 in a clockwise direction from a perspective facing into vehicle 2, it is possible to capture the "B"-pillar 2a in between the opening of upper hook 39, and stabilization flange 41, then rotating the "B"-pillar-mounted hook support assembly 102 in a counterclockwise direction, sliding the assembly downward until locking pin 42 fully engages in striker 43. At this point, it should be noted that various orientations and mirror images could be made of "B"-pillar-mounted hook support assembly 102 and its subcomponents to accomplish the same functionality.

The direction of hook 39, flange 41, and the location of support tabs 45 and pins 46 are not materially important and can be combined in any manner which allows the assembly 102 to capture "B"-pillar 2a and secure locking pin 42 into striker 43. Once "B"-pillar-mounted hook support assembly 202 is in place, parallelogram-style personal transfer lift 100 can be placed such that pins 46 pass-through pin receiver tabs 11 of a parallelogram-style personal transfer lift 100, at which point the entire system 301 functions as described above in the discussion of the parallelogram-style personal transfer lift 100 used in combination with hinge-mounted hook support assembly 101 in FIGS. 1, 2, 3, and 15.

Figure 13:
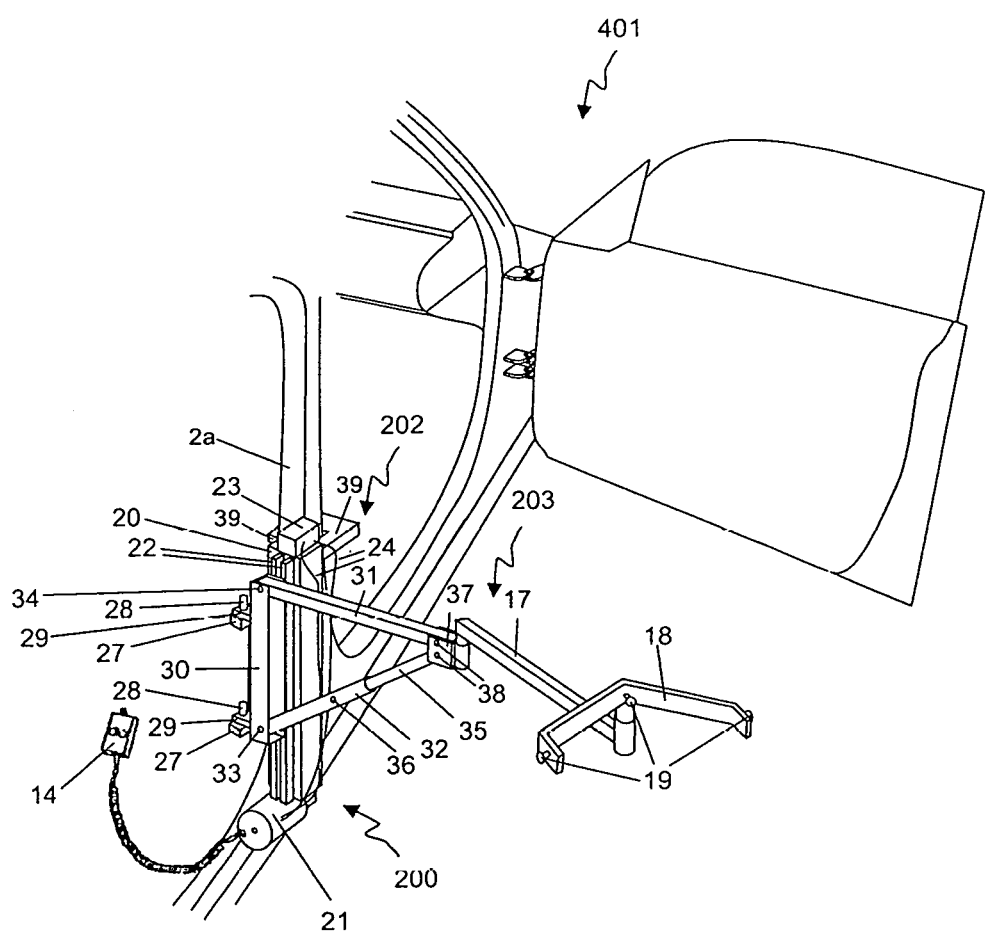
FIG. 13 shows a power lift and transfer system and attachment method in accordance with an embodiment of the present disclosure in a "B"-pillar-mounted integrated actuator style personal transfer lift version, with an integrated actuator style personal transfer lift in place on a "B"-pillar, and a personal transfer support system mounted on the integrated actuator style personal transfer lift.
Figure 16:
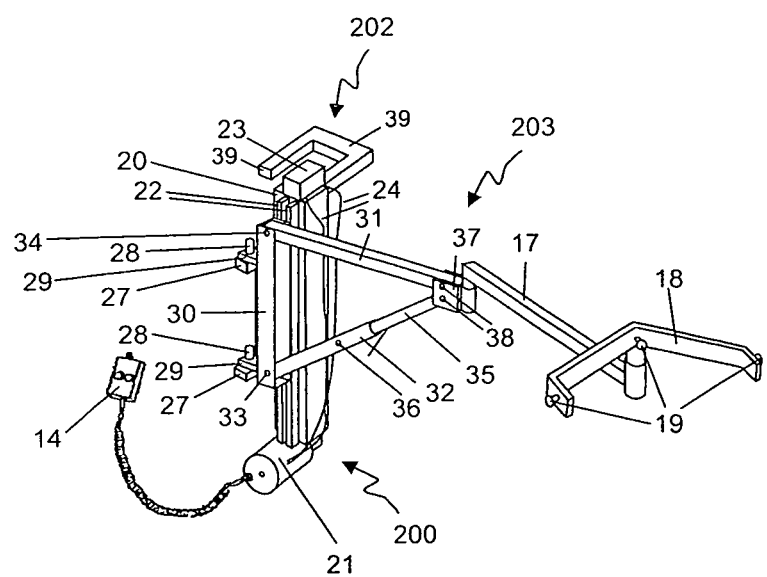
FIG. 16 shows a power lift and transfer system and attachment method in accordance with an embodiment of the present disclosure in a "B"-pillar-mounted integrated actuator style personal transfer lift version, with a personal transfer support system mounted on the integrated actuator style personal transfer lift.
Figure 17:
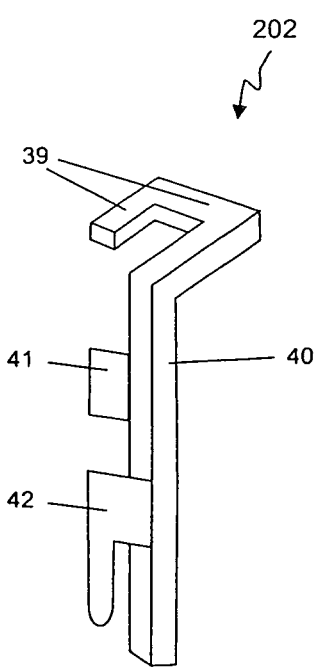
FIG. 17 shows a "B"-pillar-mounted support assembly in accordance with an embodiment of the present disclosure, for use in conjunction with an integrated actuator style personal transfer lift.

Referring to FIGS. 13, 17, and 16, there is shown system 401 comprising an integrated hook support/actuator style lift 200 used with a "B"-pillar mounted hook support assembly 202 in accordance with an embodiment of the present disclosure. In this embodiment, horizontal support 40 of "B"-pillar-mounted hook support assembly 202 as shown in FIG. 17 is firmly connected to an integrated hook support/actuator style lift 200, which combine with pivot support assembly 203 to form system 401. The integrated hook support/actuator style lift 200 of system 401 operates and is constructed as described above with reference to FIGS. 4, 5, 6, 10, and 11, and, with the exception of the aforementioned minor differentiation, the "B"-pillar mounted hook support assembly 202 operates, shares the functionality, and is constructed as described above with reference to FIGS. 12, 14, and 15.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. An apparatus for supporting a lift mechanism from at least one hinge configured to open and close a vehicle door, the apparatus comprising:
   a primary support member;
   a secondary support member extending outwardly from a first side of the primary support member in a non-rotatable manner, the secondary support member having a hook portion configured to securely engage a first hinge of the at least one hinge; and
   at least one third support member extending outwardly from a second side, opposite the first side, of the primary support member and having at least one engagement means configured to engage with the lift mechanism.

2. The apparatus of claim 1, wherein the hook portion extends downwardly from the secondary support member such that a first portion of the secondary support member rests on top of the first hinge.

3. The apparatus of claim 1, wherein the hook portion extends upwardly from the secondary support member such that the hook portion rests on back of the first hinge.

4. The apparatus of claim 1, wherein the at least one engagement means comprises a pin to rotatably engage with a recess of the lift mechanism.

5. The apparatus of claim 1, further comprising at least one stabilization flange securely connected to the primary support member, wherein the at least one stabilization flange is configured to provide lateral stabilization.

6. The apparatus of claim 1, further comprising a hinge capture fixedly connected to a second portion of the primary support member to securely engage a second hinge of the at least one hinge.

7. The apparatus of claim 1, further comprising a drive assembly to raise and lower the at least one third support member relative to the primary support member.

8. The apparatus of claim 7, wherein the at least one third support member is secured to a drive trolley, wherein the drive assembly raises and lowers the drive trolley relative to the primary support member.

9. The apparatus of claim 8, wherein the drive assembly comprises a plurality of stabilization flanges to provide lateral stability to the drive trolley.

10. The apparatus of claim 7, further comprising a safety switch to detect if the hook portion is securely engaged with the first hinge.

11. The apparatus of claim 10, wherein the safety switch prevents the drive assembly from raising and lowering the at least one third support member relative to the primary support member.

12. The apparatus of claim 1, further comprising power supply means to supply power to the lift mechanism mounted on the at least one third support member via the engagement means.

13. The apparatus of claim 12, further comprising a safety switch to detect if the hook portion is securely engaged with the first hinge.

14. The apparatus of claim 13, wherein the safety switch prevents the power supply means from supplying power to the lift mechanism.

15. An apparatus for supporting a lift mechanism from a pillar of a vehicle extending from a vehicle floor to a vehicle roof, the apparatus comprising:
a primary support member;
a secondary support member extending outwardly from a first side of the primary support member in a non-rotatable manner, the secondary support member having a hook portion configured to securely engage a first portion of the pillar; and
at least one third support member extending outwardly from a second side, opposite the first side, of the primary support member and having at least one engagement means configured to engage with the lift mechanism.

16. The apparatus of claim 15, wherein the hook portion extends laterally from the secondary support member such that the secondary support member rests against a first side of the pillar and the hook portion rests against a second side of the pillar.

17. The apparatus of claim 15, further comprising at least one stabilization flange securely connected to the primary support member, wherein the at least one stabilization flange is configured to provide lateral stabilization against a side of the pillar.

18. The apparatus of claim 15, further comprising at least one locking pin fixedly connected to a second portion of the primary support member to securely engage a second portion of the pillar, wherein the at least one locking pin engages with a striker formed in the pillar.

19. The apparatus of claim 15, further comprising a drive assembly to raise and lower the at least one third support member relative to the primary support member.

20. The apparatus of claim 15, further comprising power supply means to supply power to the lift mechanism mounted on the at least one third support member via the engagement means.

* * * * *